(No Model.)
I. S. McGIEHAN
BICYCLE TIRE.
No. 587,996.        Patented Aug. 10, 1897.
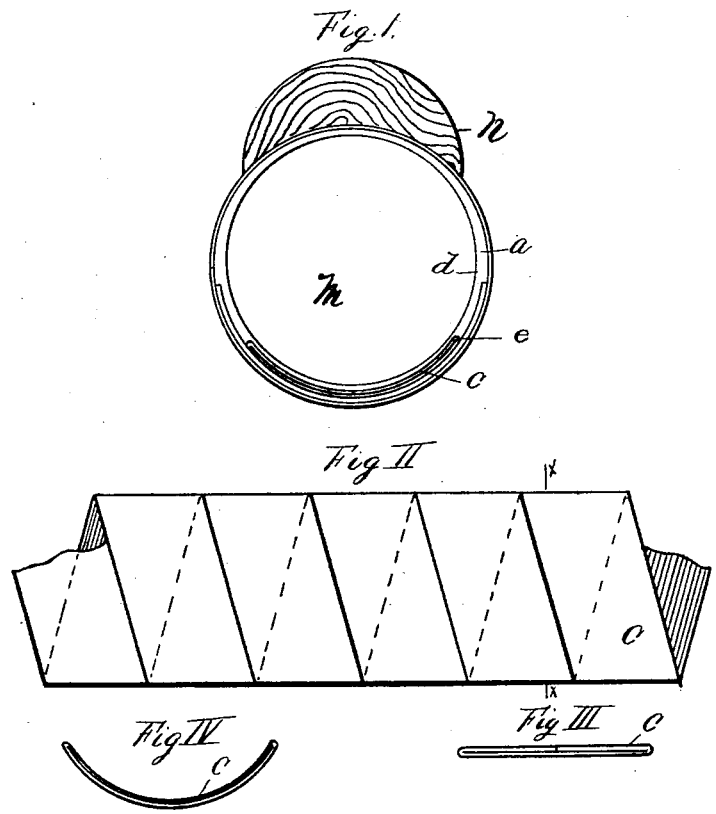
WITNESSES:
INVENTOR
ATTORNEYS.

UNITED STATES PATENT OFFICE.

ISAAC S. McGIEHAN, OF NEW YORK, N. Y.

BICYCLE-TIRE.

SPECIFICATION forming part of Letters Patent No. 587,996, dated August 10, 1897.

Application filed April 14, 1897. Serial No. 632,121. (No model.)

*To all whom it may concern:*

Be it known that I, ISAAC S. McGIEHAN, of the city, county, and State of New York, have invented a new and useful Improvement in Bicycle-Tires, of which the following is a specification.

This invention relates to non-puncturable tires for bicycles, its object being to provide a suitable armor interposed between the layers of material of which the tire is made on the tread side of the same, the said armor to be alike resilient and non-puncturable, as will be hereinafter explained.

The accompanying drawings, which form a part of this specification, illustrate my invention, with similar letters of reference to indicate corresponding parts, as follows:

Figure 1 represents a cross-section through the tube which composes the tire, showing the air-space M and rim N of the wheel, the inner lining $d$ and outer covering $a$, in between which the armor C and its backing $e$ are inserted. Fig. 2 represents a plan view of the armor C, showing the manner in which the same is constructed. Fig. 3 represents a transverse section of the same before it is concaved to fit the tube, and Fig. 4 illustrates the same after it is concaved.

The principal features of my invention consist in the manner of forming the material of which the armor is made, as well as the material employed. The majority of armors heretofore created have usually been so rigid as to destroy the elastic nature of the tire and others have been so soft as to destroy the life of the tire and make it less resilient. The object, therefore, is to create an armor which will prevent the tire from being punctured and at the same time retain all of its elastic nature. An armor to do this of course must be capable of being bent in any and all directions while in use and to stretch with the tire—in other words, contract or expand. To accomplish this result, I take a piece of material of which the armor is composed about three-fourths of an inch wide and of suitable length and fold it over at an angle of about ninety degrees. Then at a distance from the first fold which shall be equal to the width of the armor I refold it back again at the same angle under the first fold and continue this process of folding until a long flat spring is formed the length of the tire, like that shown in Fig. 2. It will be thus seen that each lap of the armor covers the seam of the two adjacent laps, so as to make practically a continuous armor of solid substance capable of being bent, stretched, or compressed to accommodate the pressure on the outside of the tire or the air within. When the armor is completed to the extent shown in Figs. 2 and 3, it is then made concave to fit the tire, as shown in Fig. 4.

The material of which the armor is composed is prepared pigskin, which after being formed wet and then dried possesses a very springy nature and at the same time is sufficiently tough to prevent anything from penetrating it under the ordinary use of a bicycle. For general heavy road use, where resilience is not so necessary, the pigskin armor formed in longitudinal layers that will permit it to stretch slightly when the tire is inflated and treated as described will answer every purpose.

Although pigskin forms a part of my invention and I believe it to be the best material for the purpose, I do not wish to confine myself wholly to its use, as I believe the principal value and success lie in the manner of constructing the armor in folds from one continuous piece, thus giving it the springy and elastic nature necessary, as well as the requisite contraction and expansion.

After the armor is completed I usually back it with soft cotton, as shown at $e$, and especially if the armor be made of metal, so that should the armor become broken the sharp ends will not protrude and cut the outer covering $a$. Where pigskin is used, however, this is not necessary, as there is no danger of its breaking. The pigskin, before being formed, is usually treated with paraffin-wax or rosin, especially when it is desired to make a very thin tire for racing.

Having thus described my invention, what I claim, and desire to secure by Letters Patent of the United States, is—

1. In a bicycle-tire, a flexible and non-puncturable armor adapted to be inserted at the tread side of said tire and composed of two laminated series of substantially parallel plates, plates of one of said series constituting connections between the opposing non-contiguous edges of adjoining plates in the other of said series, substantially as described.

2. In a bicycle-tire, a flexible armor adapted to be inserted at the tread side of a bicycle-tire and composed of a strip of pigskin or other non-puncturable material, so folded as to form laminated series of substantially parallel plates, plates of one of said series constituting connections between the opposing non-contiguous edges of adjoining plates of the other of said series, substantially as described.

3. In a bicycle-tire, a flexible armor adapted to be inserted at the tread side of a bicycle-tire and composed of a strip of pigskin or other non-puncturable material, so folded as to form laminated series of substantially parallel plates, plates of one of said series constituting connections between the opposing non-contiguous edges of adjoining plates of the other of said series, said armor being so shaped as to conform to the contour of the tread of the tire, substantially as described.

4. A tubular bicycle-tire composed of the inner and outer layers $a$ and $d$, a flexible armor inserted between said layers and composed of a strip of non-puncturable material, so folded as to form laminated series of substantially parallel plates, plates of one of said series constituting connections between the opposing non-contiguous edges of adjoining plates of the other of said series, and a covering or backing $c$ for said armor, said armor being so shaped as to conform to the contour of the tread of the tire, substantially as described.

In testimony that I claim the foregoing improvement in bicycle-tires as above described I have hereunto set my hand this 13th day of April, 1897.

ISAAC S. McGIEHAN.

Witnesses:
C. L. MALCOLM,
J. H. BELL.